Nov. 10, 1925.
F. E. ZAISS
1,561,202
MACHINE FOR FORMING CANDY
Filed Sept. 28, 1923
8 Sheets-Sheet 1

Inventor
Fred E. Zaiss
By Fred Gerlach
his Atty

Nov. 10, 1925.

F. E. ZAISS 1,561,202

MACHINE FOR FORMING CANDY

Filed Sept. 28, 1923     8 Sheets-Sheet 4

Nov. 10, 1925.
F. E. ZAISS
1,561,202
MACHINE FOR FORMING CANDY
Filed Sept. 28, 1923    8 Sheets-Sheet 5
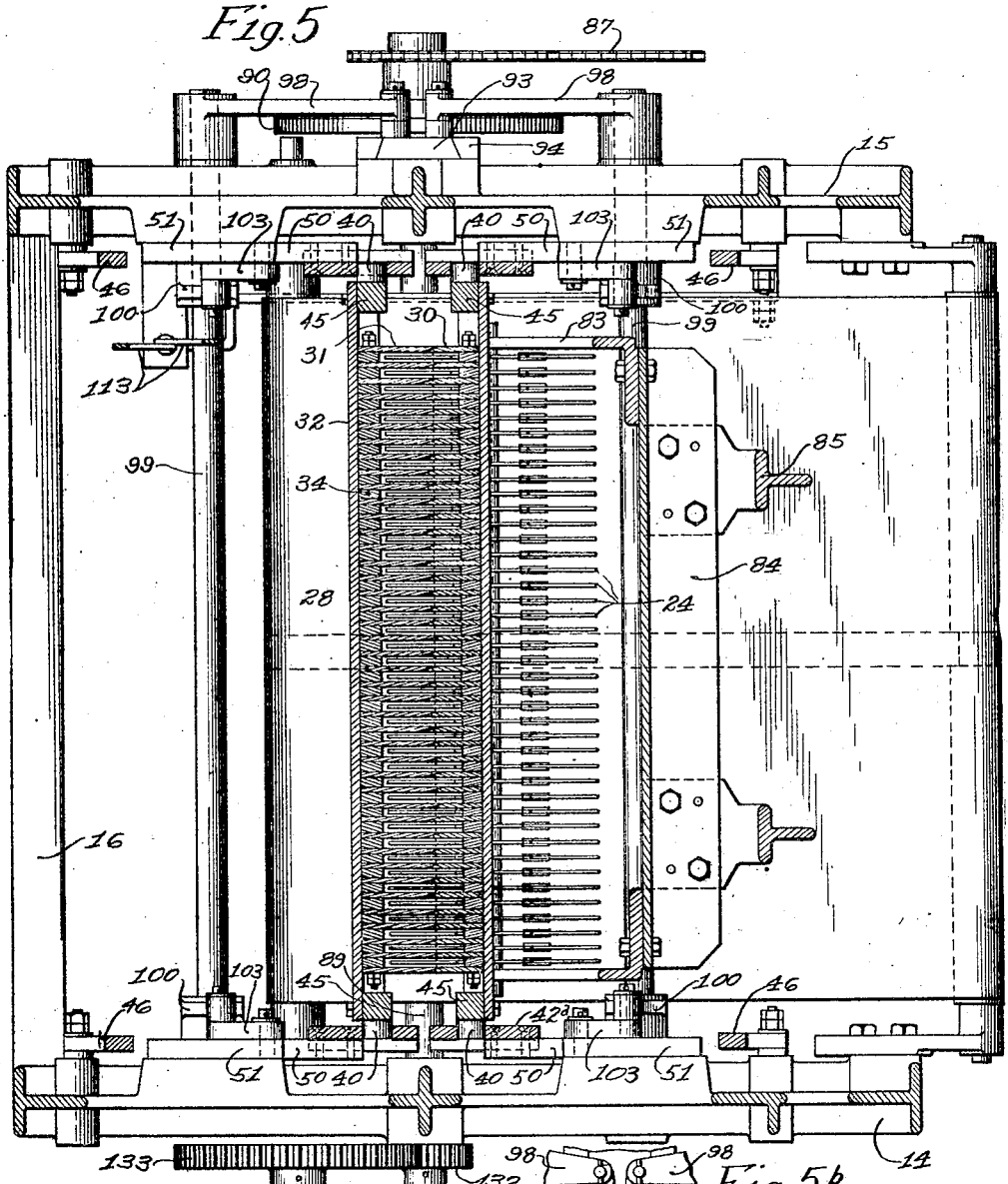
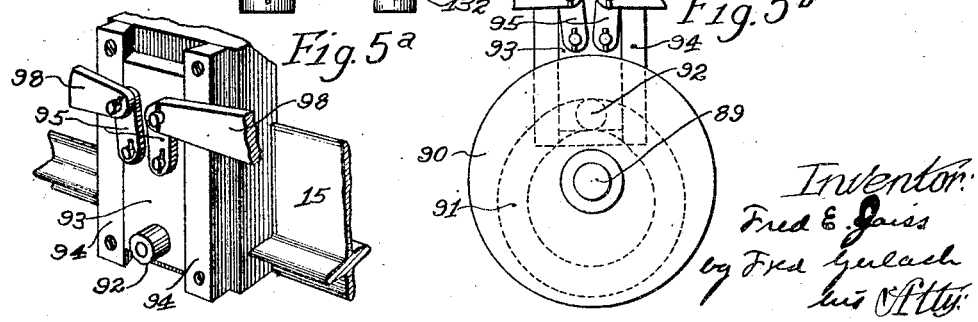
Inventor:
Fred E. Zaiss
by Fred Gerlach
his Atty.

Nov. 10, 1925.
F. E. ZAISS
1,561,202
MACHINE FOR FORMING CANDY
Filed Sept. 28, 1923     8 Sheets-Sheet 6
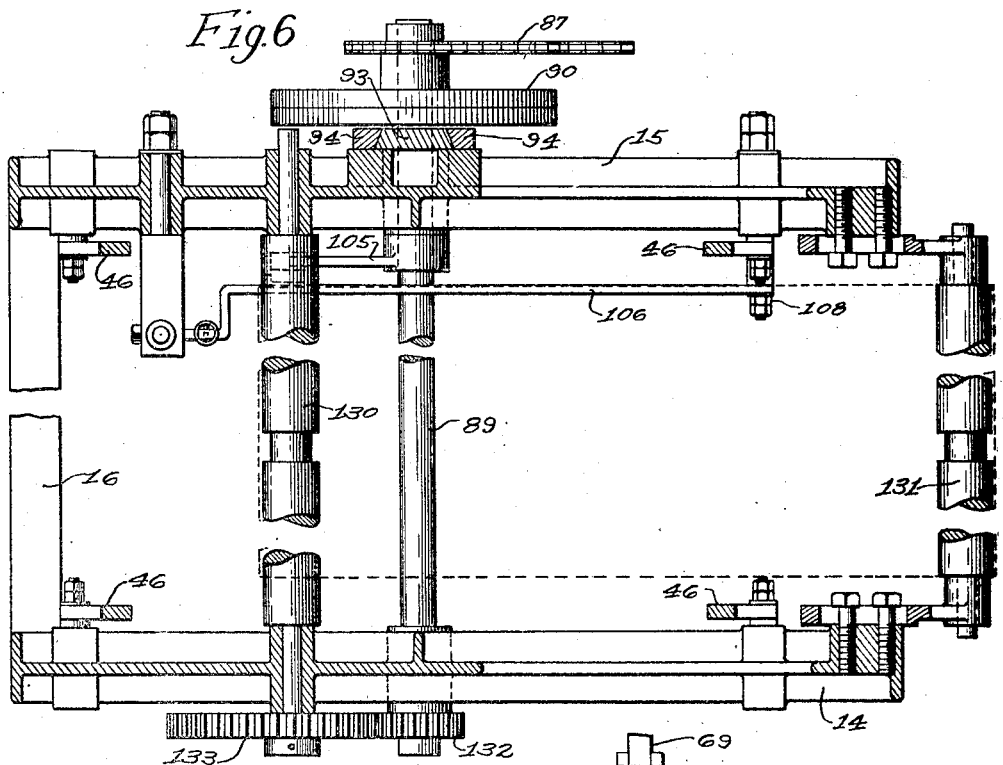
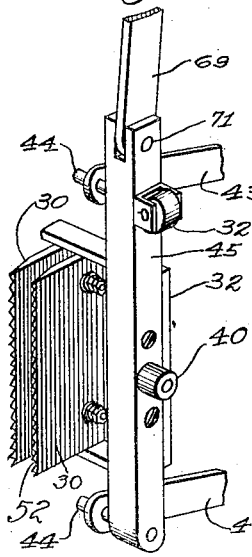
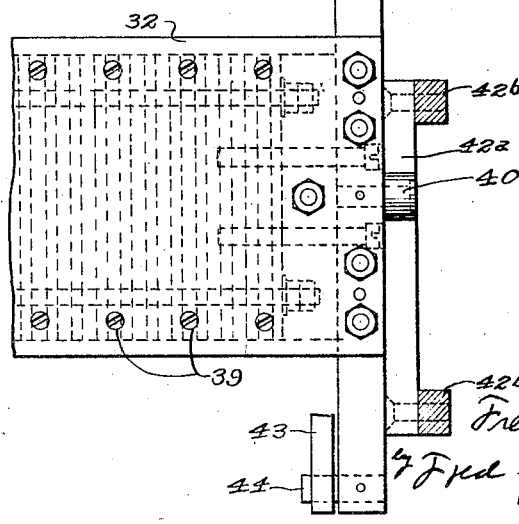

Nov. 10, 1925.
F. E. ZAISS
1,561,202
MACHINE FOR FORMING CANDY
Filed Sept. 28, 1923   8 Sheets-Sheet 7
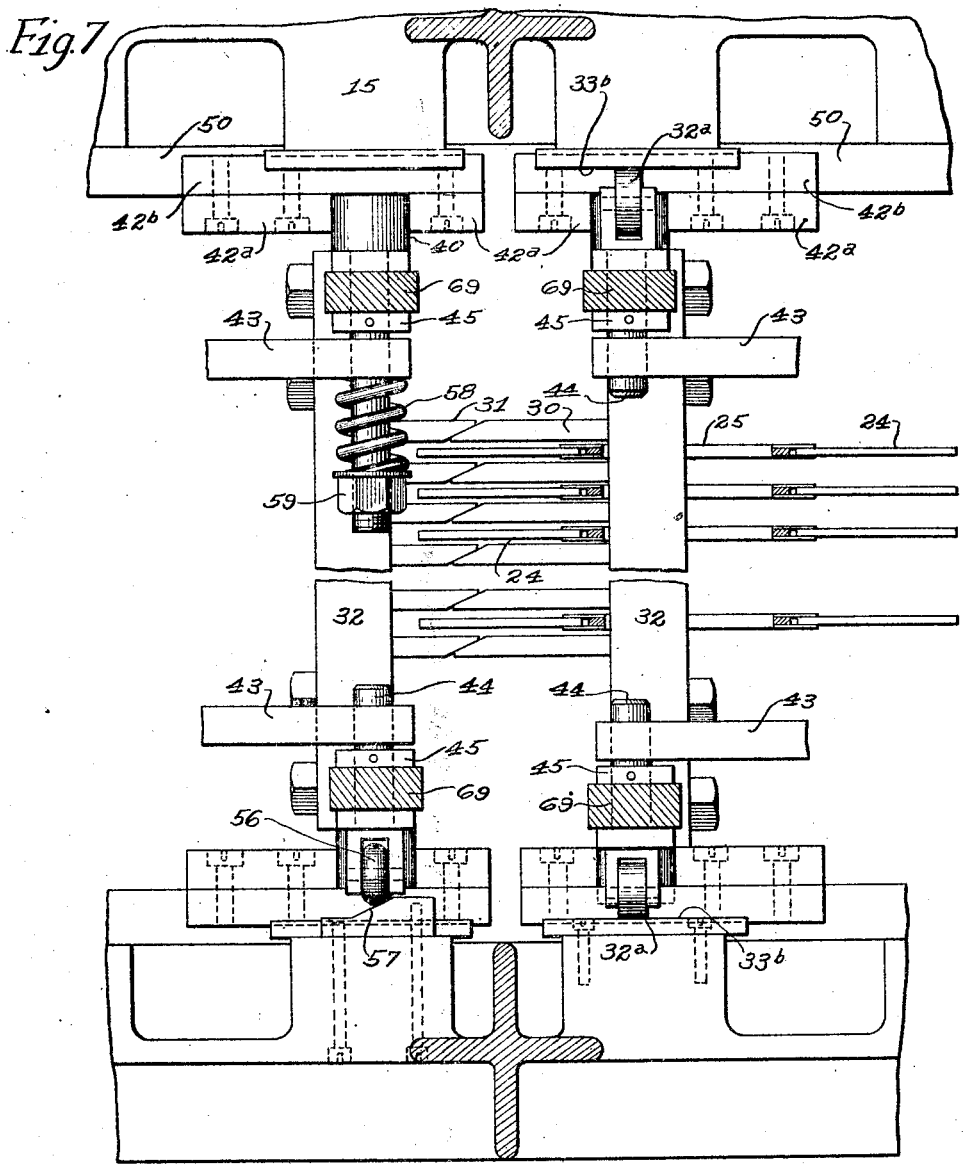
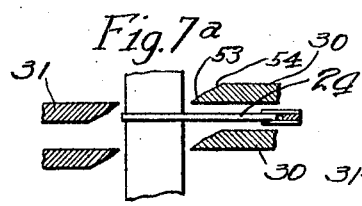
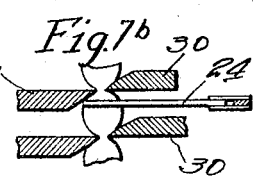
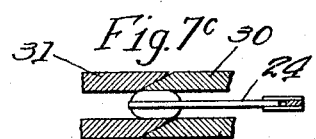
Inventor:
Fred E. Zaiss
By Fred Gerlach
his Atty.

Nov. 10, 1925.
F. E. ZAISS
1,561,202
MACHINE FOR FORMING CANDY
Filed Sept. 28, 1923   8 Sheets-Sheet 8
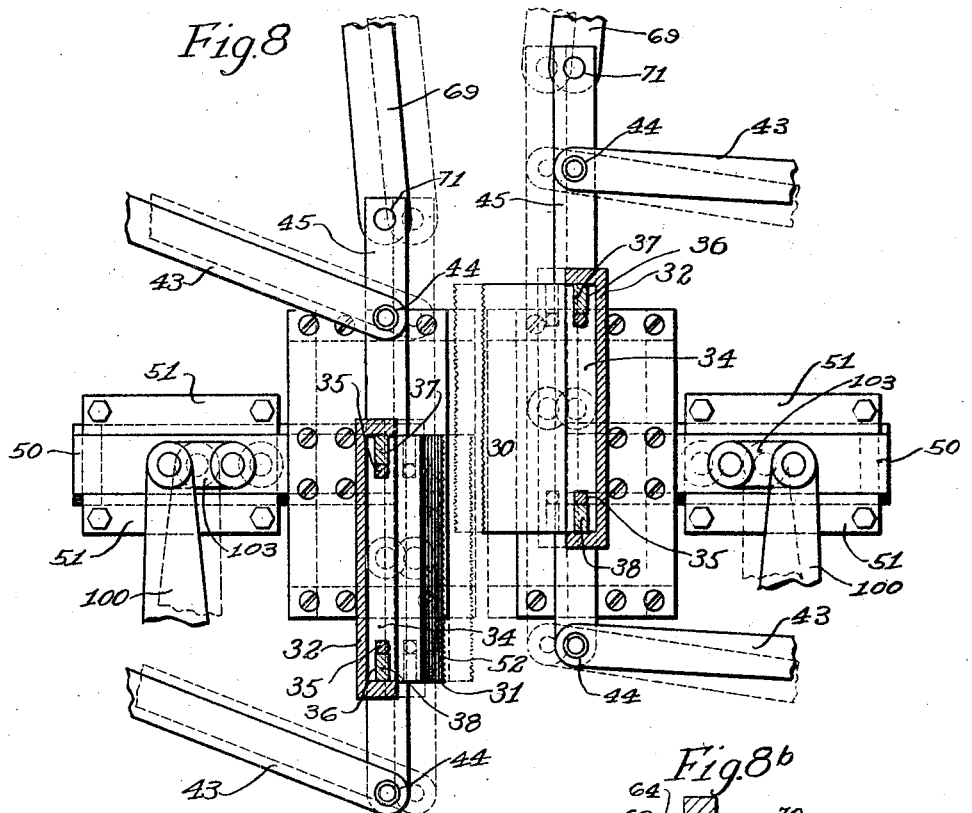
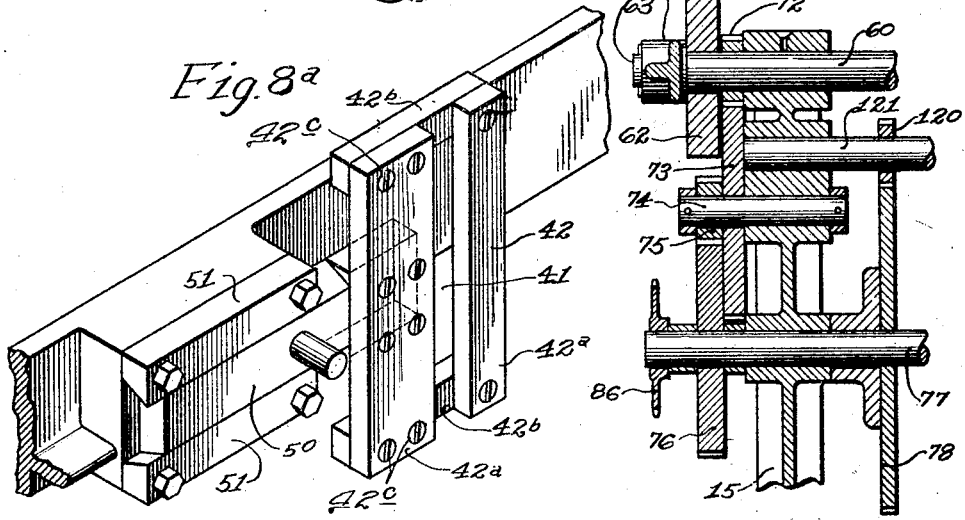
Inventor:
Fred Zaiss
By Fred Gerlach
his Atty.

Patented Nov. 10, 1925.

1,561,202

UNITED STATES PATENT OFFICE.

FRED E. ZAISS, OF BEVERLY HILLS, CALIFORNIA.

MACHINE FOR FORMING CANDY.

Application filed September 28, 1923. Serial No. 665,255.

*To all whom it may concern:*

Be it known that I, FRED E. ZAISS, a citizen of the United States, and a resident of Beverly Hills, in the county of Los Angeles and State of California, have invented certain new and useful Improvements in Machines for Forming Candy, of which the following is a full, clear and exact description.

The invention relates to machines for forming candy and more particularly to the product generally known as "kisses," which are formed by cutting a stick, which may or may not be striped or otherwise ornamented, into a series of small pieces.

The objects of the invention are: to provide improved means for severing a stick into short pieces; to provide an improved machine in which the short pieces are squeezed or flattened by the cutting mechanism itself, so that separate presser mechanism may be dispensed with; to provide a machine of this character which is efficient in operation and adapted to produce a large output; and to provide a machine which is constructed so that it may be advantageously and commercially operated. Other objects of the invention will appear from the detailed description.

The invention consists in the several novel features hereinafter set forth and more particularly defined by claims at the conclusion hereof.

Figure 1:
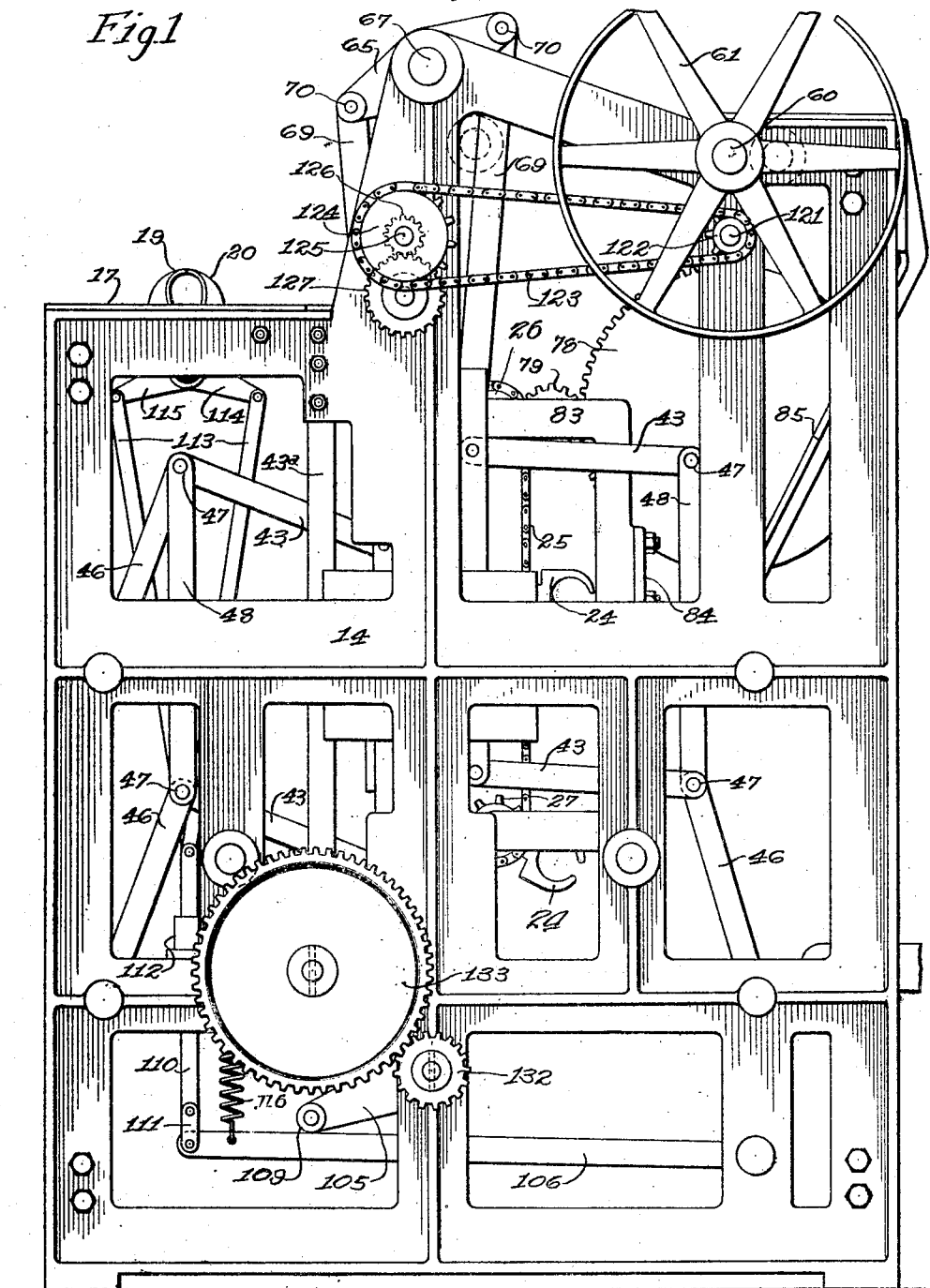
Figure 2:
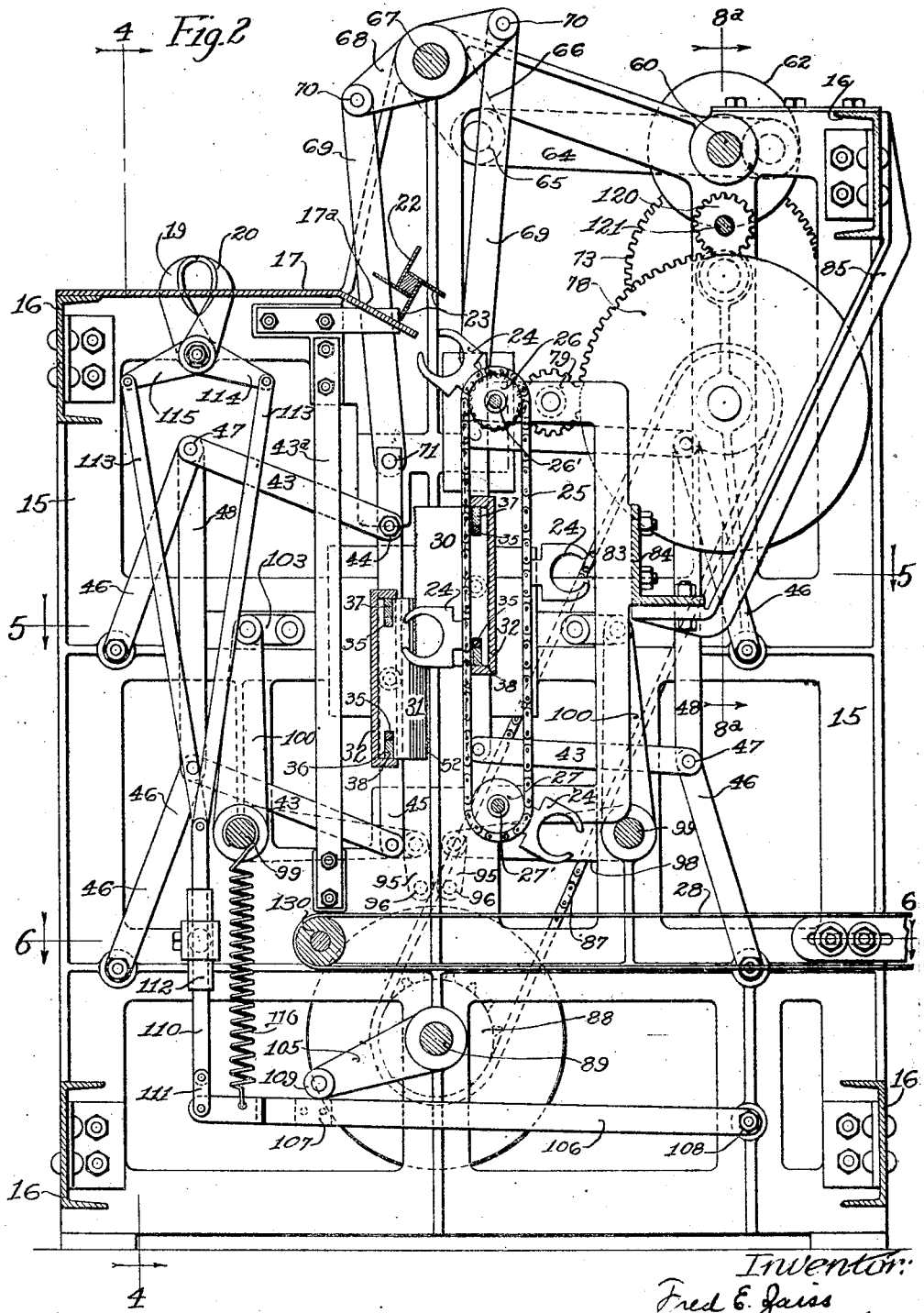
Figure 3:
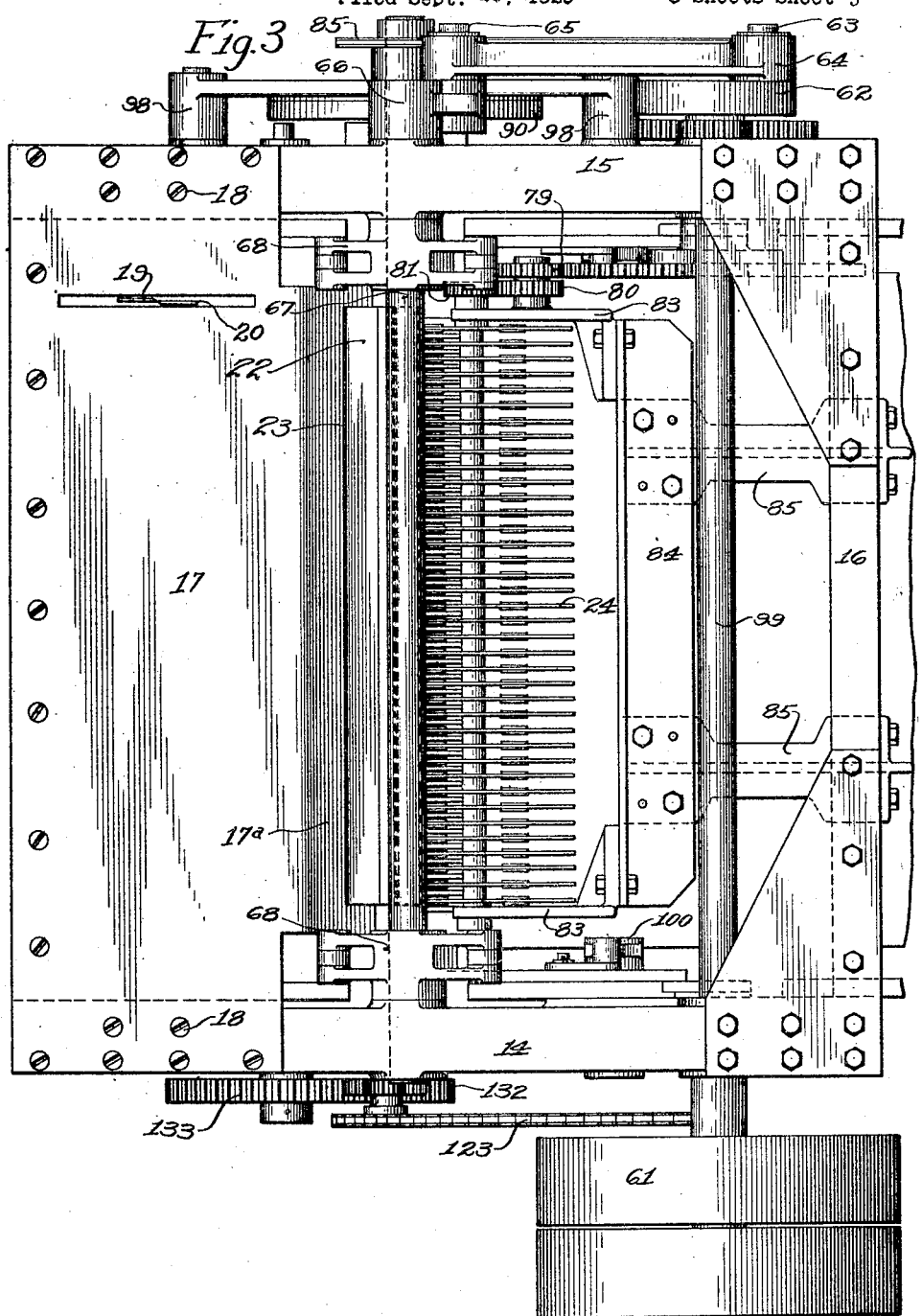
Figure 4:
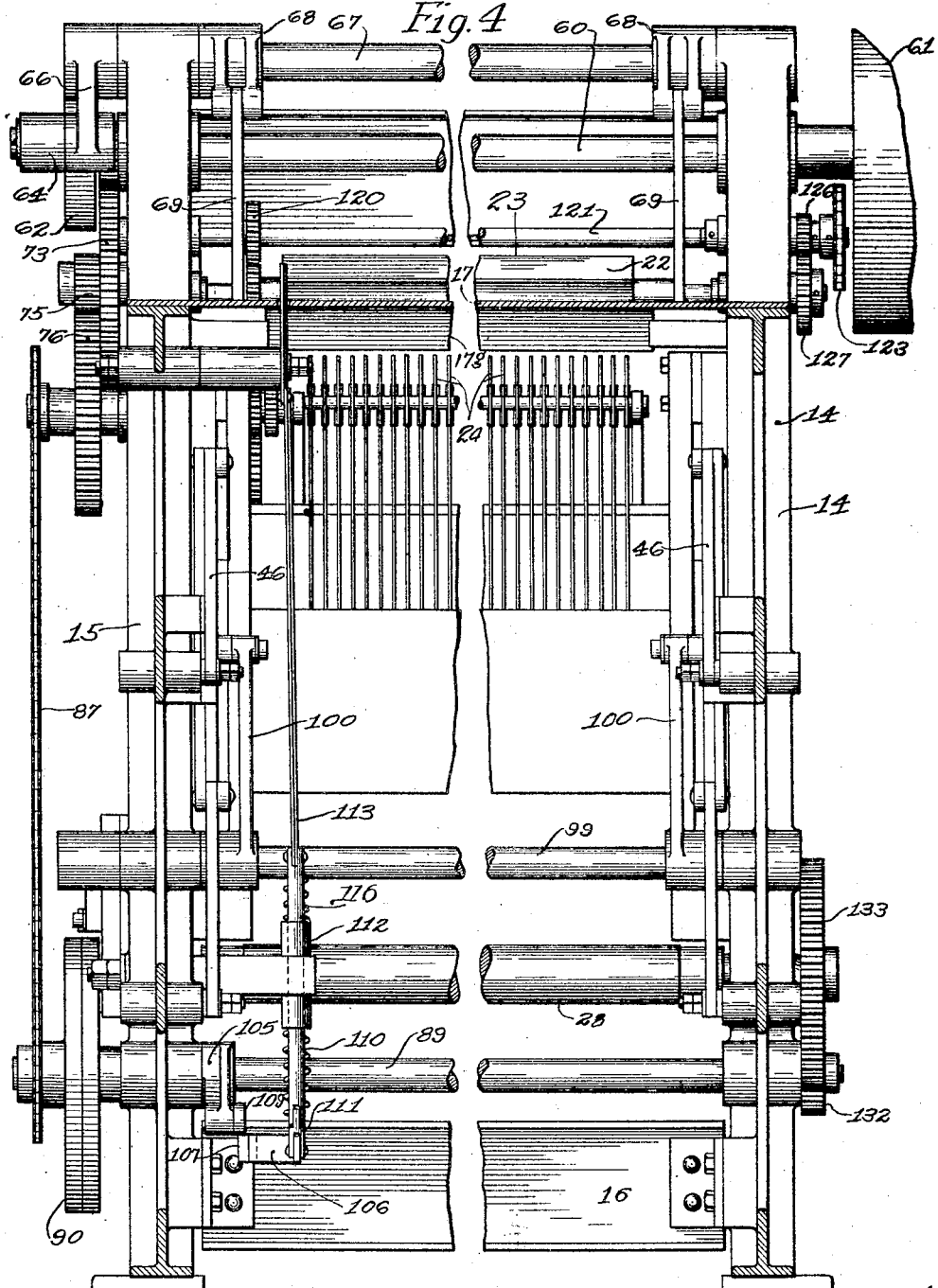

In the drawings: Fig. 1 is a side elevation of a machine embodying the invention. Fig. 2 is a vertical longitudinal section. Fig. 3 is a plan. Fig. 4 is a section on line 4—4 of Fig. 2. Fig. 5 is a section on line 5—5 of Fig. 2. Fig. 5ª is a detail perspective of the slide for moving the cutter-head to and from each other. Fig. 5ᵇ is a detail of the cam for shifting said slide. Fig. 6 is a section taken on line 6—6 of Fig. 2. Fig. 6ª is a back view of a portion of one of the cutter carriers. Fig. 6ᵇ is a detail perspective of one end of one of the cutter-heads. Fig. 7 is a plan, upon an enlarged scale, of the cutters, parts being shown in section. Fig. 7ª is a detail, showing the position of the knives while a length of candy is being lowered between them. Fig. 7ᵇ is a similar view showing the position assumed by the cutters at the point where they are about to complete the cutting of the length into pieces. Fig. 7ᶜ is a similar view, showing the cutters as they are compressing the pieces of candy. Fig. 8 is a detail, showing the coacting cutters. Fig. 8ª is a detail perspective of one of the laterally movable guides for the vertically reciprocable cutter-heads. Fig. 8ᵇ is a section on line 8ª—8ª of Fig. 2.

The invention is exemplified in a machine comprising a pair of side-frames 14 and 15 which are rigidly cross-connected by channel-bars 16 to form a rigid unitary supporting structure or frame. A table 17 (Figs. 2 and 3) is fixed, by screws 18, on the frame and is adapted to receive a continuous strip of candy from a sizing machine. The strip is fed or drawn transversely across the table and is severed into lengths or sticks of the length which the machine is adapted to receive, by a pair of shears comprising members 19 and 20 which are intermittently operated for this purpose by mechanism hereinafter set forth. The inner end of the table 17 is inclined downwardly, as at 17ª, to deliver the lengths to a rotatable feeder 22 which comprises four blades 23, and is adapted to feed the lengths into carriers 24, which are adapted to feed the lengths downwardly into position to be operated on and retain them while they are being severed by the reciprocable cutters. The operator places the lengths successively into position on the inner end of table 17, from which they will be singly displaced by feeder 22 into the adjacently arrested and intermittently operated series of carriers 24. This feeder is intermittently operated in properly timed relation with the carriers by mechanism hereinafter more fully described. The construction thus far described exemplifies mechanism for clipping lengths from a continuous strip to the desired size and for feeding them to the carriers.

The carrier mechanism consists of four sets of carriers 24. The carriers of each series are transversely aligned to receive a length of candy from feeder 22, corresponding in number to the number of pieces into which a length is severed, are spaced apart to permit the cutters for severing the lengths into pieces to work between them and are adapted to support the candy between the knives and the severed pins individually to convey them away from the cutters. These carriers are individually attached to links of vertically extending endless chains 25 which extend around upper sprocket-wheels 26 and lower sprocket-wheels 27 and support and operate them. These chains are intermittently operated so that after the set of carriers, which is in its length-receiving position, has received a length of candy from feeder 22, said set will be lowered one cycle to lower the length into position to be acted upon by the reciprocatory cutters and to be retained in such position until the length has been severed into small pieces. Simultaneously with the lowering into position of one set of carriers to bring a length into position to be cut, the previously lowered set will be lowered to discharge the severed pieces onto an endless conveyor-belt 28, and another set will be brought into position to be loaded.

The cutter mechanism consists of a set or row of pairs of coacting vertically reciprocating cutters 30 and 31, there being one pair of each of said cutters for each carrier 24. Each set of cutters is secured in a transversely extending channelled head 32. The cutters of each set are separated from one another by spacers 34. Each set of cutters, with their spacers between them, is secured together by transversely extending bolts 35 which extend through registering open-ended slots 36 in the upper and lower ends of the knives and spacers. Each set of knives is held in its head by upper and lower bars 37 and 38 which extend into slots 36 and screws 39 for said bars which are adapted to clamp the cutters against the backs of their supporting heads. One set of cutters is reciprocated so as to work in the opposite direction to the other set. Cutters 30 and 31 are also movable to and from one another so that, while they are separated, a length of candy may be lowered into position to be cut and also so they may be brought together to gradually constrict and roll the candy until the constricted portion has been completely severed and also to prevent the cutters of one set overlapping those of the other. One of the cutter-heads 31 is also movable longitudinally or endwise, that is, transversely of the machine, relatively to the other, so that the pieces of candy between adjacent overlapping cutters will be compressed during the cutting and rolling operation. To support the cutter-heads for vertical reciprocation, each head is provided at either end with a roller 40 (Fig. 6ª) which is guided in a vertical runway 41 (Fig. 8ª). Each runway is formed in a laterally movable head 42 composed of vertical plates 42ª and cross-bars 42ᵇ, all rigidly secured together by screws 42ᶜ. Each cutter-head is guided vertically, so as to maintain the parallelism between the cutters during their reciprocation, by upper and lower parallel links 43 which have their inner ends pivoted at 44 to a vertical bar 45, which is rigidly secured to one of the cutter-heads, upper and lower parallel arms 46, which have their inner ends pivoted, at 47, to links 43, and a vertical link 48 between pivots 47. These linkages cause the oppositely working cutters and their heads to remain parallel during their reciprocations. Each head is laterally slidable to spread and close the cutters, and for this purpose has affixed thereto a dove-tailed bar 50 which is slidable in guide-bars 51 which are fixed to the frame. Each cutter blade is provided with fine saw-teeth 52, with a bevelled surface 53 adjacent the teeth, and a bevelled surface 54 outwardly of bevel 53. The bevelled surfaces of coacting cutters, as they are moved together, gradually constrict the length of candy until it has been severed into pieces, and during this movement, the cutters on one head are moved longitudinally relatively to the other, so the coacting cutters overlap one another, and the sides of one set will be brought closer to the contiguous sides of the other set to act as squeezing-elements to compress or flatten the severed pieces into the shapes desired.

In this action, one set of knives (31), with its head 32, is movable transversely and the bevelled faces of one set of cutters slide past and overlap the bevelled edges of the other set. To effect this transverse movement, its rollers 40 are longitudinally movable in their guideways 41 and pivots 44, between links 43 and bars 45, which are fixed to the cutter-head for knives 31, are slidable in said links, and rollers 56 carried by one of the bars 45 ride vertically extending cams 57, which are shaped so that before and after the overlap of the knives commences, and during their vertical reciprocations, the cutter-head for said knives will be shifted transversely of the machine to cause the knives of one set to slide past the knives of the other set and reduce the spaces between adjacent knives and correspondingly shape the pieces of candy. The links 43 for guiding the head 32 for knives 31 are held against movement transverse of the machine by bars 43ª, so that they will remain stationary while the head for knives 31 is shifted endwise. A spring 58 coiled around one of the pins 49 engages a nut 59 on said pin and presses the cutter-head 32 to retain roller 56 in engagement with cam 57. Cutter head 32 for knives 30 is guided against transverse movement by rollers 32ª which bear against tracks 33ᵇ which are fixed to the frame, so that the head will be effectively secured against endwise movement while the cutters are being reciprocated.

A main continuously operated drive-shaft 60 is mounted in suitable bearings in the main frame and is adapted to be driven by power applied in any suitable manner to a pulley 61 fixed to said shaft. The mechanism for vertically reciprocating the cutter-heads, to reciprocate the cutters in opposite directions, comprises a disk 62 (Figs. 2 and 8ᵇ), a wrist-pin 63 on said disk, a pitman 64 having one of its ends pivoted to said wrist-pin and its other end pivoted, as at 65, to an arm 66 which is fixed to a shaft 67 which is journalled in the main frame, rocker-levers 68 also fixed to said shaft and provided with diametrically opposite arms, and links 69 respectively pivoted, as at 70, to the outer ends of said lever-arms and, as at 71, to the upper ends of the vertical bars 45 which are fixed to the cutter-heads respectively. This mechanism imparts continuous reciprocatory movement to the cutters 30, 31, so they will move in opposite directions and so their saw-tooth edges will coact on the length of candy between them, to rotate the length of candy during the cutting and compressing operations.

The mechanism for intermittently operating the carrier-chains 25 to successively bring lengths of candy into position to be acted upon by the cutters, comprises a pinion 72 (Fig. 8ᵇ) fixed to shaft 60; a gear-wheel 73 fixed to a stud-shaft 74, which is journalled in one of the frame-sides and is rigid with pinion 75 on shaft 74; a gear-wheel 76 meshing with pinion 75 and fixed to a shaft 77; an intermittent-toothed or Geneva gear 78 fixed to shaft 77; a pinion 79 adapted to be alternately rotated one revolution by each revolution of gear 78 and locked; a pinion 80 fixed to rotate with pinion 79; and a pinion 81 fixed to shaft 26', on which the upper series of sprockets 26 are secured. This mechanism locks the carrier-chains 25, so that one set of carriers 24 will be positioned to receive a length from feeder 22 and another set will hold a previously received length while it is being acted upon by the reciprocatory cutters, and also intermittently operates the chains 25 to advance one set of carriers from receiving position into position to be acted upon by the cutters and advances the set ahead to discharge the severed pieces. The lower sprockets 27 are fixed to a shaft 27'. The shafts 26', 27', for the sprocket-wheels 26, 27 are stationarily mounted in brackets 83, which are fixed to an angle-iron bar 84 which is fixed to the main frame by brackets 85.

The mechanism for shifting the coacting cutters to and from one another comprises a sprocket-wheel 86 fixed to rotate with shaft 77; a sprocket-chain 87 driven by said sprocket; a sprocket 88 driven by said chain and fixed to a shaft 89 which is journalled in the frame (Fig. 4); a cam 90, provided with a cam-groove 91; and a roller 92 carried by a vertically movable slide 93 mounted in a guideway 94 on the frame (Fig. 5ᵃ). Each pair of cutter-head-guides 42 is connected to slide 93 by a link 95 pivoted at 96 to slide 93; an arm 98 pivoted to link 95 and fixed to a shaft 99; vertical arms 100 fixed to said shaft having their upper ends connected to one of the slide-bars 50 by a link 103. This device operates the cutter-heads in opposite directions. Cam groove 91 is shaped to cause the cutters to be spread apart during the lowering of each length of candy by a set of carriers 24 and to gradually bring the cutters together while they are being vertically reciprocated and until the length has been completely severed into pieces and the pieces have been compressed into the desired shape.

The mechanism for operating shears 19, 20 to sever lengths from the strip of candy received from the sizer comprises an arm 105 fixed to rotate with continuously rotating shaft 89, a lever 106 pivoted to the frame at 108 and carrying a block 107 adapted to be intermittently struck and pressed downwardly by a roller 109 on arm 105; a slide-bar 110 pivotally connected by a link 111 to the free end of lever 106 and mounted to slide in a sleeve 112 fixed to the frame; and links 113 having their lower ends pivoted to the upper end of slide-bar 110 and their upper ends connected to arms 114 and 115, which are fixed to the shear-blades 19, 20 respectively. A spring 116 is connected to lever 106 which retracts the shear-operating mechanism. The operation of arm 106 is properly timed to operate the shears 19, 20, and snip a length from the continuous strip of candy, so that the length will be cut on table 17 in readiness to be placed into the feeder 22 by the operator.

The mechanism for intermittently operating feeder 22 to successively deliver lengths of candy from table 17 into the adjacent series of carriers 24, comprises a Geneva-pinion 120, meshing with Geneva-gear 78 and fixed to a shaft 121, which is journalled in the frame, the pinion being adapted to be alternately rotated one revolution, and then locked, a sprocket-pinion 122 fixed to shaft 121, a chain 123 driven by sprocket 122, a sprocket 124 driven by chain 123 and mounted on a stud 125 by the frame, a pinion 126 rotating with sprocket 124, and a gear 127 meshing with pinion 126 and fixed to the feeder-shaft 22. This mechanism is adapted to rotate the feeder one quarter of a revolution for each operation of the carriers and between such operations said mechanism will be locked by the locking surfaces between pinion 120 and gear 78. The operation of the feeder is timed so as to deliver a length of candy into a set of carriers before the carriers are shifted.

A conveyor-belt 28 is carried by rollers 130, 131 which are suitably mounted in the frame. This belt is continuously driven by a pinion 132 (Fig. 1) which is fixed to rotate with continuously driven cam-shaft 89 and meshes with a gear 133 which is fixed to the shaft of roller 130 (Figs. 1 and 5).

The operation of the machine will be as follows: The strip of candy from the sizer will be delivered onto table 17 and when so delivered shears 19, 20, will be operated to sever a length from the strip. The operator will then move the length downwardly into the feeder 22, which will be operated one step to deposit the length or stick into the adjacent set of carriers 24, while they are at rest. The loaded set of carriers will then be operated by its intermittent driving mechanism until they have been lowered into position to hold the length between the oppositely reciprocating cutters 30, 31, and thereupon the carriers will be locked by the Geneva gears 78, 79 so that the length of candy will be confined in the carriers for the cutting and squeezing operations. During the lowering of the length into said position, the coacting knives 30, 31, will be separated to permit the length to be lowered between them. The cutters will be continuously reciprocated vertically and the cutter heads 32 will be gradually shifted together to cause the saw-teeth of the cutters to roll the length of candy and concentrically constrict or indent portions thereof until the cutting edges meet (Fig. 7ᵇ) whereupon the length will be completely severed into small pieces, each of which will be retained in one of the carriers 24. When the coacting and reciprocating cutters have been moved together so the saw-teeth are close together, cam 57 will move one of the cutter-heads endwise so the contiguous bevelled faces of coacting cutters will overlap and clear each other. Thereafter, the cutter heads 32 will continue to move together and as the inner ends of the cutters overlap, they will reduce the space between the cutters so that the pieces of candy will be compressed by the cutters (Fig. 7ᶜ). When the pressing operation has been completed, the carrier chains will be operated another cycle to cause the pieces of candy held in the carriers to pass below the cutters and fall on belt 28, from which they will be conveyed out of the machine. The same cycle of movement of the carriers will cause the next set of carriers to bring a length of candy, with which it has been loaded, into position between the cutters, the latter having, in the meantime, been separated to permit another length to be lowered into position to be acted upon by the cutters. The machine will be continuously operated, the lengths being automatically and intermittently fed by the carriers to the cutting and pressing mechanism.

The invention exemplifies a machine for making candy, in which the lengths are severed into pieces by continuously reciprocating cutters in connection with carriers which deliver the lengths into position to be acted upon by the cutters; in which the cutter mechanism, after severing the length into pieces, serves to press the pieces into the desired shape; which is adapted to produce an exceptionally high output; and in which provision is made for operating shears to sever the lengths from a continuous strip.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine of the character described the combination of a gang of devices for cutting a length of candy into pieces, each device comprising a pair of relatively reciprocable cutters having edges extending longitudinally of the path of reciprocation of the cutters and adapted to roll the candy between them, and mechanism for operating the cutters in a path longitudinally of said edges.

2. In a machine of the character described, the combination of a gang of devices for cutting a length of candy into pieces, each device comprising a pair of oppositely reciprocable cutters having edges extending longitudinally of the path of reciprocation of the cutters and adapted to roll the candy between them, and mechanism for operating the cutters in a path longitudinally of said edges.

3. In a machine of the character described, the combination of a gang of devices for cutting a length of candy into pieces, each device comprising a pair of oppositely vertically reciprocable cutters having vertically extending edges adapted to roll the candy between them, and mechanism for operating the cutters.

4. In a machine of the character described, the combination of a gang of devices for cutting a length of candy into pieces, each device comprising a pair of oppositely vertically reciprocable cutters having vertically extending edges adapted to roll the candy between them, means for holding a length of candy between the cutters, and mechanism for operating the cutters.

5. In a machine of the character described, the combination of a gang of devices for cutting a length of candy into pieces, each device comprising a pair of relatively reciprocable cutters movable to and from one another to gradually constrict the candy, mechanism for reciprocating the cutters, and mechanism for shifting the cutters together during the operation of the cutters.

6. In a machine of the character described, the combination of a gang of devices for cutting a length of candy into pieces, each device comprising a pair of oppositely reciprocable cutters, movable to and from one another, mechanism for reciprocating the cutters having edges extending longitudinally of their path of reciprocation and adapted to roll the candy between them, mechanism for controllably shifting the cutters together during the operation of the cutters and means for moving the candy while it is being acted on by the cutters independently of the movement of the cutters.

7. In a machine of the character described, the combination of a gang of devices for cutting a length of candy into pieces, each device comprising a pair of oppositely and vertically reciprocable cutters movable horizontally to and from one another, mechanism for operating the cutters, and mechanism for shifting the cutters together during the operation of the cutters.

8. In a machine of the character described, the combination of a gang of devices for cutting a length of candy into pieces, each device comprising a pair of oppositely and vertically reciprocable cutters, movable horizontally to and from one another, means for feeding a length of candy into position between the cutters, mechanism for operating the cutters, and mechanism for shifting the cutters together during the operation of the cutters.

9. In a machine of the character described, the combination of a gang of devices for cutting a length of candy into pieces, each device comprising a pair of coacting relatively reciprocating cutters having edges extending longitudinally of their path of reciprocation and adapted to roll the candy between them, means for delivering lengths into position to be acted upon by said cutters, and mechanism for operating said delivery-means and said cutters.

10. In a machine of the character described, the combination of a gang of devices for cutting a length of candy into pieces, each device comprising a pair of coacting relatively reciprocating cutters having edges extending longitudinally of their path of reciprocation and adapted to roll the candy between them, means for delivering lengths into position to be acted upon by said cutters, and mechanism for intermittently operating said delivery-means and continuously operating said cutters.

11. In a machine of the character described, the combination of a gang of devices for cutting a length of candy into pieces, each device comprising a pair of coacting relatively reciprocating cutters having edges extending longitudinally of their path of reciprocation and adapted to roll the candy between them, means for delivering and retaining lengths into position to be acted upon by said cutters, and mechanism for operating the delivery-means and said cutters.

12. In a machine of the character described, the combination of a gang of devices for cutting a length of candy into pieces, each device comprising a pair of coacting oppositely reciprocating cutters, means for delivering and retaining lengths into position to be acted upon by said device comprising members adapted to pass between adjacent cutting devices, and mechanism for intermittently operating said delivery-means and continuously operating said cutters.

13. In a machine of the character described, the combination of a gang of devices for cutting a length of candy into pieces, each device comprising a pair of relatively reciprocable coacting cutters, having edges extending longitudinally of their path of reciprocation to roll the candy between them, mechanism for reciprocating the cutters longitudinally of said edges to sever the length into pieces, and means to operate the cutters to press the pieces between them while the cutters are being reciprocated longitudinally of said edges.

14. In a machine of the character described, the combination of a gang of devices for cutting a length of candy into pieces, each device comprising a pair of oppositely reciprocable coacting cutters, having edges extending longitudinally of their path of reciprocation to roll the candy between them, mechanism for reciprocating the cutters longitudinally of said edges to sever the length into pieces, and means to shift said cutters to press the pieces between them while the cutters are being reciprocated longitudinally of said edges.

15. In a machine of the character described, the combination of a gang of devices for cutting a length of candy into pieces, each device comprising a pair of vertically and laterally reciprocable cutters, mechanism to reciprocate said cutters to sever the length into pieces and to press the pieces, and mechanism to controllably shift the cutters laterally to press the pieces between them.

16. In a machine of the character described, the combination of a gang of devices for cutting a length of candy into pieces, each device comprising a pair of oppositely reciprocable cutters, means to deliver into and hold lengths of candy in position to be cut, means to operate said cutters to sever the lengths into pieces, and means to operate the cutters, to press the pieces between them.

17. In a machine of the character described, the combination of a gang of devices for cutting a length of candy into pieces, each device comprising a pair of relatively reciprocable cutters movable to and from one another, mechanism for shifting the cutters together to cut the length, one set of cutters being movable transversely to the other and adapted to press the severed pieces against the other set, means for shifting said transversely movable set to squeeze the pieces, and mechanism for reciprocating the cutters.

18. In a machine of the character described, the combination of a gang of devices for cutting a length of candy into pieces, each device comprising a pair of oppositely reciprocable cutters, both movable to and from one another to cut a length between them, mechanism for shifting the cutters together to penetrate the length, one set of cutters being movable transversely to the other to press the severed pieces between them, means for shifting said transversely movable set to squeeze the pieces, and mechanism for reciprocating the cutters.

19. In a machine of the character described, the combination of a gang of devices for cutting a length of candy into pieces, each device comprising a pair of oppositely and vertically reciprocable cutters, movable to and from one another to cut the length between them, mechanism for shifting the cutters to gradually penetrate the length together, one set of cutters being movable transversely to the other to press the severed pieces between them, means for shifting said set to squeeze the pieces, and mechanism for operating the cutters.

20. In a machine of the character described, the combination of a gang of devices for cutting a length of candy into pieces, each device comprising a pair of oppositely reciprocable cutters whereby a length will be rotated between them and movable to and from one another to cut the length, mechanism for shifting the cutters together to penetrate the length, one set of cutters being movable transversely to the other to press the severed pieces between them, means for shifting said transversely movable set to squeeze the pieces, means to deliver lengths to and hold them between the cutters while they are being cut, and mechanism for operating the cutters.

21. In a machine of the character described, the combination of a gang of devices for cutting a length of candy into pieces, each device comprising a pair of relatively reciprocable cutters, a set of carriers adapted to hold the length of candy between the cutters, mechanism for operating the cutters, and mechanism for intermittently shifting the carriers.

22. In a machine of the character described, the combination of a gang of devices for cutting a length of candy into pieces, each device comprising a pair of oppositely reciprocable cutters, a set of carriers adapted to hold a length of candy between the cutters, mechanism for the cutters, and mechanism for intermittently shifting the carriers.

23. In a machine of the character described, the combination of a gang of devices for cutting a length of candy into pieces, each device comprising a pair of relatively reciprocable cutters, a plurality of sets of carriers, each adapted to pass and hold a length of candy between the cutters, mechanism for continuously operating the cutters to sever the lengths into pieces, and mechanism for intermittently shifting the carriers.

24. In a machine of the character described, the combination of a gang of devices for cutting a length of candy into pieces, each device comprising a pair of relatively reciprocable cutters, a plurality of sets of carriers, each adapted to pass and hold a length between the cutters, endless elements for supporting the carriers, mechanism for operating the cutters, and mechanism for intermittently operating said elements to shift the carriers.

25. In a machine of the character described, the combination of a gang of devices for cutting a length of candy into pieces, mechanism for operating the cutters, shears for cutting a length from a continuous strip, carrier mechanism for delivering lengths to the cutters, mechanism for operating the shears, and mechanism for operating the carrying mechanism.

26. In a machine of the character described, the combination of a gang of devices for cutting a length of candy into pieces each comprising a pair of coacting relatively reciprocable cutters, mechanism for reciprocating the cutters, the cutters being relatively movable to squeeze the pieces between them, carrier mechanism for delivering lengths to the cutters, and mechanism for intermittently operating the carrying mechanism.

27. In a machine of the character described, the combination of a gang of devices for cutting a length of candy into pieces, each device comprising a pair of coacting cutters, cutter-heads in which sets of cutters are mounted, said heads being longitudinally and transversely reciprocable, mechanism for longitudinally reciprocating the heads in opposite directions, mechanism for controllably shifting the heads transversely to and from one another to cause the cutters to penetrate the length while they are being reciprocated longitudinally, and carrier mechanism for holding lengths in and delivering them into position to be acted upon by the cutters.

28. In a machine of the character described, the combination of a gang of devices for cutting a length into pieces, each device comprising a pair of coacting cutters, cutter heads in which the sets of cutters are mounted, both of said heads being vertically and transversely reciprocable, mechanism for vertically reciprocating the heads in opposite directions, mechanism for shifting the heads transversely to and from one another while being vertically reciprocated, and carrier mechanism for holding lengths in position to be acted upon by the cutters.

29. In a machine of the character described, the combination of a gang of devices for cutting a length into pieces, each device comprising a pair of coacting cutters, cutter-heads in which the sets of cutters are mounted, both of said heads being vertically and transversely reciprocable, mechanism for vertically reciprocating the heads in opposite directions, mechanism for shifting the heads transversely to and from one another while being vertically reciprocated, and carrier mechanism for holding lengths in position to be acted upon the by the cutters, comprising elements adapted to pass between the cutters.

30. In a machine of the character described, the combination of a gang of devices for cutting a length into pieces, each device comprising a pair of coacting cutters, cutter heads in which the sets of cutters are mounted, both of said heads being vertically and transversely reciprocable, mechanism for vertically reciprocating the heads in opposite directions, mechanism for shifting the heads transversely to and from one another while being vertically reciprocated, and intermittently operated carrier mechanism for holding lengths in position to be acted upon by the cutters.

31. In a machine of the character described, the combination of a gang of devices for cutting a length into pieces, each device comprising a pair of coacting cutters, cutter heads in which the sets of cutters are mounted, both of said heads being longitudinally and transversely reciprocable of the cutters, mechanism for longitudinally reciprocating the heads in opposite directions, mechanism for shifting the heads to and from one another so the cutters will penetrate the length, one of said heads being movable relatively to the other, means for shifting the latter head transversely.

Signed at Chicago, Illinois, this 1st day of June, 1923.

FRED E. ZAISS.